United States Patent [19]

Janné

[11] 4,417,963

[45] Nov. 29, 1983

[54] PROCESS FOR REMOVING CYANIDE IONS FROM SOLUTIONS

[75] Inventor: Jouko Janné, Köping, Sweden

[73] Assignee: Nils-Erik Södermark, Köping, Sweden

[21] Appl. No.: 355,749

[22] PCT Filed: Jul. 7, 1981

[86] PCT No.: PCT/SE81/00205

§ 371 Date: Mar. 1, 1982

§ 102(e) Date: Mar. 1, 1982

[87] PCT Pub. No.: WO82/00288

PCT Pub. Date: Feb. 4, 1982

[30] Foreign Application Priority Data

Jul. 11, 1980 [SE] Sweden ................................ 8005138

[51] Int. Cl.³ .............................................. C25B 1/00
[52] U.S. Cl. ...................................... 204/130; 204/149
[58] Field of Search ............................... 204/130, 149

[56] References Cited

U.S. PATENT DOCUMENTS 2,773,025 12/1956 Ricks .................................... 204/149
3,764,497 10/1973 Tarjanyi .............................. 204/130
4,029,557 6/1977 Christensen et al. ............... 204/130

Primary Examiner—R. L. Andrews
Attorney, Agent, or Firm—Burns, Doane, Swecker & Mathis

[57] ABSTRACT

A process for removing cyanide ions from a cyanide-containing solution by anodic oxidation. The solution is adjusted to a pH of at least about 11 and to a halide content at least equivalent to the cyanide concentration. Electrolysis is performed using intense agitation of the electrolyte to result in deposition of solid carbon on the anode.

13 Claims, 3 Drawing Figures

PROCESS FOR REMOVING CYANIDE IONS FROM SOLUTIONS

TECHNICAL FIELD

The present invention relates to a process for removing cyanide ions from a cyanide-containing solution by anodic oxidation.

In several industries cyanide chemicals are used for different purposes resulting in liquid waste not allowable for disposal in available recipients. Therefore, the cyanide-containing liquid waste or solutions must be freed from their contents of cyanides before being discharged into recipients or municipal sewers. Examples of such industries are noble metal workshops, iron and steel industries, the photographic industries and surface finishing industries.

BACKGROUND ART

Up to now the cyanide-containing waste has been collected in destruction facilities within the plant, usually large basins, where destruction has taken place by oxidation with sodium hypochlorite. Small plants have to collect their wastes in closed vessels which have to be transferred to destruction plants with concomittant high costs. It is also known to destroy the cyanide contents of solutions by anodic oxidation, but the technology developed up to now has been complicated and requires long electrolyzing periods. Examples of the latter type of techniques are found in U.S. Pat. No. 3,764,499, Swiss patent specification No. 444,066 and published Swedish patent application No. 77-12278-6.

SUMMARY OF THE INVENTION

The present invention provides for a new process for removing cyanide ions from cyanide-containing solutions through which the disadvantages associated with the prior art are avoided or substantially reduced. In the process of the invention using anodic oxidation for destroying the cyanide ions the pH of the solution is adjusted to a value of at least about 11 and the halide content of the solution shall be at least equivalent to the cyanide concentration. The crux of the invention lies in the finding that when electrolysis is performed using intense agitation of the electrolyte the period of time required for full destruction of the cyanide ions will be substantially reduced. It has also been found that using the conditions outlined above results in deposition of solid carbon on the anode.

The technique of the invention enables treatment of any liquid waste containing cyanide ions. Thus, for example electroplating baths containing 10-20 grams of cyanide per liter of solution can be efficiently treated using the process of the invention. Of course, liquid waste containing smaller concentrations of cyanides may also be made harmless using the inventive technique.

It is preferred to provide the agitation of the electrolyte by stirring same. In providing for efficient stirring it is suitable to use a propeller to impart a rotary motion to the electrolyte. It is particularly preferred to provide for such intense agitation that air is sucked into the electrolyte. In addition to the fact that this will substantially shorten the period of time of electrolysis it also prevents uneven corrosion of the anode, particularly local corrosion at the interphase between surrounding air and electrolyte.

In a preferred embodiment of the invention the halide content of the solution is adjusted to about twice the equivalent of the cyanide concentration, and as a halide sodium chloride is preferred, but any alkali metal halide can be used, the chlorides being preferred.

The electrolysis is suitably performed using a current density of about 3-3.5 A per $dm^2$, and to adjust the pH of the solution sodium hydroxide is the preferred choice of base.

When the process of the present invention is used for rendering harmless the cyanide-containing waste solutions resulting from the recovery of noble metals in accordance with patent application No. 355,570 filed 3-1-82, the cyanide ion removal can advantageously take place in the same electrolyzer. In this case new cathode plates are introduced into the electrolyzing vessel and the direction of current is reversed so that said plates become anodes onto which the deposition of carbon takes place. This will have for an effect that contamination of the walls of the electrolyzing vessel is avoided.

EXAMPLE

The invention will be further illustrated in the following by a non-limiting specific example in conjunction with the appended drawing, wherein.

Figure 1:
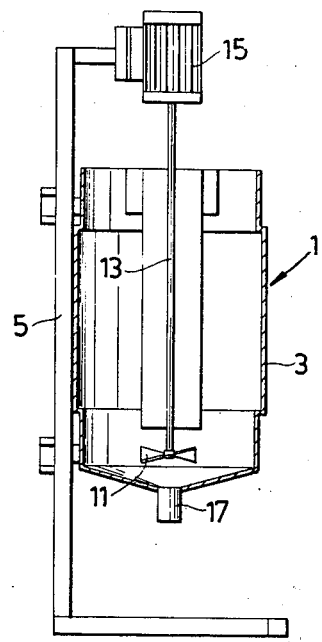
FIG. 1 shows an elevational side view of an electrolyzer for use in the process of the invention.
Figure 2:
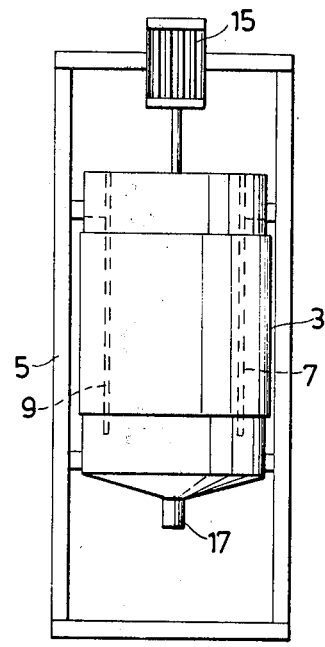
FIG. 2 shows an elevational front view of the electrolyzer of FIG. 1.
Figure 3:
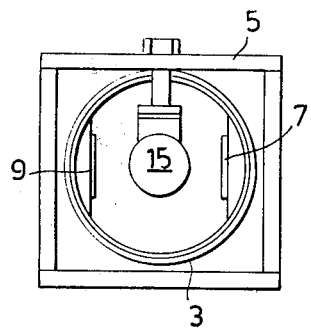
FIG. 3 shows a top view of the electrolyzer of FIG. 1.

In the drawing, the electrolyzer shown is generally designated 1. The electrolyzer 1 includes a vertical cylindrical vessel 3 attached to a fixture or stand 5. Vessel 3 contains vertically extending anode plates 7, 9, whereas the vessel 3 proper constitutes cathode. Vessel 3 is connected to the negative electrode of a source of direct current, whereas the anode plates 7, 9 are attached to the positive electrode. All these features are conventional in the art and therefore not shown in the drawing.

Vessel 3 contains a centrally positioned propeller 11 connected by a shaft 13 to a motor 15 for its operation. At the lower end vessel 3 is provided with a discharge pipe 17.

All parts of the electrolyzer 1 coming into contact with the solution or material to be electrolyzed are made of acid-resistant steel.

In the instant example the electrolyzing vessel 3 has a volume of about 300 liters and propeller 11 is positioned about 10 cm above the bottom of vessel 3.

Vessel 3 of electrolyzer 1 is charged with about 300 liters of cyanide-containing liquid waste. The contents of cyanide ions is about 2.5 g per liter solution. The waste treated is the residual material remaining after noble metal recovery in accordance with the above-mentioned patent application filed simultaneously herewith.

By adding sodium hydroxide the pH-value of the liquid is adjusted to about 11 and, furthermore, there is added about 1% by weight of sodium chloride.

Under intense stirring with a propeller speed of about 900 revolutions per minute the contents of the vessel are electrolyzed using a current density of about 3-3.5 $A/dm^2$ at a voltage of about 16 volts. After a period of time of 15 minutes practically all cyanide contents of the liquid had been oxidized and the anode plates 7, 9 were coated with a layer of pure carbon powder.

The primary advantage of the process of the invention lies in the short period of time necessary for complete electrolysis of the cyanide-containing solution. In the conventional art the period of electrolysis is usually of the order of several hours, for example 6 to 8 hours, whereas the technique of this invention enables complete electrolysis to be obtained within a fraction of an hour.

It is to be noted that the invention is not delimited to the above example. Thus, as halides other substances than sodium chloride may be used. However, from a commercial point of view sodium chloride is preferred, as is sodium hydroxide for use as a base.

I claim:

1. A process for removing cyanide ions from a cyanide-containing solution by anodic oxidation, the solution being adjusted to a pH of at least about 11 and to a halide content at least equivalent to the cyanide concentration, characterized thereby that electrolysis is performed under intense agitation of the electrolyte to result in deposition of solid carbon on the anode.

2. A process according to claim 1, characterized thereby that the agitation is provided by stirring the electrolyte.

3. A process according to claim 2, characterized thereby that a propeller is used to stir the electrolyte.

4. A process according to claim 2, wherein the agitation is such that air is sucked into the electrolyte.

5. A process according to claim 3, wherein the agitation is such that air is sucked into the electrolyte.

6. A process according to claim 1, wherein the halide content of the solution is adjusted to about twice the equivalent of the cyanide concentration.

7. A process according to claim 5, wherein the halide content of the solution is adjusted to about twice the equivalent of the cyanide concentration.

8. A process according to claim 1, wherein sodium chloride is used to adjust the halide content of the solution.

9. A process according to claim 1, wherein the electrolysis is performed using a current density of about 3 to 3.5 $A/dm^2$.

10. A process according to claim 5, wherein the electrolysis is performed using a current density of about 3 to 3.5 $A/dm^2$.

11. A process according to claim 1, wherein the sodium hydroxide is used to adjust the pH of the solution.

12. A process for removing cyanide ions from a cyanide-containing solution by anodic oxidation, comprising adjusting the pH of the solution to at least about 11, adjusting the halide content of the solution so that it is at least equivalent to the cyanide concentration, and performing the electrolysis under sufficiently intense agitation such that air is sucked into the electrolyte.

13. A process for removing cyanide ions from a cyanide-containing solution by anodic oxidation, comprising adjusting the pH of the solution to a value of at least about 11, adjusting the halide content of the solution so that it is at least equivalent to the cyanide concentration, and performing the electrolysis under sufficiently intense agitation such that air is sucked into the electrolyte and under a current density of about 3 to 3.5 $A/dm^2$ at a voltage of about 16 volts.

* * * * *